DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED FEBRUARY 2, 1971

883 O.G. 11

T883,013
RETOUCHING COLORED PHOTOGRAPHIC PICTURES

Arthur D. Kuh, Penfield, N.Y.
(1669 Lake Ave., Rochester, N.Y. 14650)

Filed May 27, 1970, Ser. No. 41,102
Int. Cl. G03c *7/00*
U.S. Cl. 96—56
No Drawing. 6 Pages Specification

Colored photographic images obtained in multilayer color films by color-forming development are retouched to reduce the cyan dye density by treatment of the colored images with a mixture of a 5-pyrazolone coupler and a competing coupler such as a naphthol sulfonic acid, to uncouple some of the cyan dye and form a soluble dye washing out of the film.